(12) United States Patent
Josso

(10) Patent No.: US 9,014,140 B2
(45) Date of Patent: Apr. 21, 2015

(54) METHOD AND APPARATUS FOR PERFORMING INTER RADIO ACCESS TECHNOLOGY MEASUREMENTS

(75) Inventor: Nicolas Josso, La Chapelle Saint Fray (FR)

(73) Assignees: ST-Ericsson SA, Plan-les-Ouates (CH); ST-Ericsson (France) SAS, Grenoble (FR)

( * ) Notice: Subject to any disclaimer, the term of this patent is extended or adjusted under 35 U.S.C. 154(b) by 354 days.

(21) Appl. No.: 13/320,077

(22) PCT Filed: May 11, 2010

(86) PCT No.: PCT/EP2010/056485
§ 371 (c)(1),
(2), (4) Date: Nov. 11, 2011

(87) PCT Pub. No.: WO2010/130749
PCT Pub. Date: Nov. 18, 2010

(65) Prior Publication Data
US 2012/0051258 A1    Mar. 1, 2012

(30) Foreign Application Priority Data
May 15, 2009    (EP) .................................... 09305443

(51) Int. Cl.
*H04W 36/00* (2009.01)
*H04W 36/14* (2009.01)
*H04W 36/30* (2009.01)
*H04W 88/06* (2009.01)

(52) U.S. Cl.
CPC .......... *H04W 36/0088* (2013.01); *H04W 36/14* (2013.01); *H04W 36/30* (2013.01); *H04W 88/06* (2013.01)

(58) Field of Classification Search
USPC ......... 370/230, 278, 322, 328, 329, 331, 335; 455/67.11, 418, 423, 436, 502
See application file for complete search history.

(56) References Cited

U.S. PATENT DOCUMENTS

| 6,438,117 | B1* | 8/2002 | Grilli et al. ................ 370/331 |
| 2006/0223557 | A1* | 10/2006 | Manohar .................... 455/502 |
| 2008/0189970 | A1* | 8/2008 | Wang et al. ................. 33/701 |

FOREIGN PATENT DOCUMENTS

| EP | 1467582 A1 | 10/2004 | |
| SE | EP 1467582 | * 10/2004 | .............. H04Q 7/32 |
| WO | 2008/085952 A1 | 7/2008 | |

OTHER PUBLICATIONS

International Search Report for PCT/EP2010/056485 mailed Jul. 22, 2010.
Written Opinion for PCT/EP2010/056485 mailed Jul. 22, 2010.
Extended European Search Report for EP Application No. 09305443.5 mailed Oct. 6, 2009.
3GPP, "Universal Mobile Telecommunications System (UMTS); Physical layer; Measurements (FDD) (3GPP TS 25.215 version 8.3.0 Release 8)," ETSI TS 125 215 v8.3.0, Mar. 2009, Technical Specification, XP14043966, pp. 1-26.
3GPP, "Universal Mobile Telecommunications System (UMTS); Requirements for support of radio resource management (FDD) (3GPP TS 25.133 version 8.6.0 Release 8)," ETSI TS 125 133 v8.6.0, Apr. 2009, Technical Specification, XP14043951, pp. 1-210.

* cited by examiner

*Primary Examiner* — Michael Thier
*Assistant Examiner* — Prince A Mensah
(74) *Attorney, Agent, or Firm* — Patent Portfolio Builders PLLC

(57) ABSTRACT

The present invention relates to a method of performing inter System radio measurements in compressed mode. A communication device, camped on a first radio communication network, performing the method determines whether a given measurement gap coincides in time domain with a measurement position defined by the communication device. In case the measurement position coincides with the position of the measurement gap, then the communication device performs consequently during the measurement gap a first type of measurement with respect to the first communication network and a second type of measurement with respect to a second communication network.

14 Claims, 3 Drawing Sheets

METHOD AND APPARATUS FOR PERFORMING INTER RADIO ACCESS TECHNOLOGY MEASUREMENTS

TECHNICAL FIELD

The present invention relates to a method of performing radio measurements in a compressed mode. More specifically, the present invention relates to a situation where inter system measurements are carried out. The invention equally relates to a corresponding communication device for carrying out the measurements and to a computer program product comprising instructions for implementing the steps of the method.

BACKGROUND OF THE INVENTION

In radio communication systems, such as third generation (3G) wideband code division multiple access (WCDMA) based systems, using continuous transmission and reception, the compressed mode, often referred to as the slotted mode, is needed to make measurements from another frequency without a full dual receiver terminal. The compressed mode means that transmission and reception are halted for a short time period, e.g. few milliseconds, in order to perform measurements on the other frequencies. The aim is not to lose data but to compress the data transmission in the time domain. The compressed mode is needed both for inter-frequency and inter-system handovers.

By taking a specific example, 3GPP technical specification 25.215 v8.3.0 (2009-03) Chapter 6 gives further details on compressed mode regarding universal terrestrial radio access (UTRA) frequency division duplex (FDD). On command from the universal terrestrial radio access network (UTRAN), a user equipment (UE) terminal shall monitor cells on other FDD frequencies and on other modes and radio access technologies that are supported by the UE (i.e. time division duplex (TDD), global system for mobile communications (GSM), evolved UTRA). To allow the UE to perform measurements, UTRAN shall command that the UE enters in compressed mode, depending on the UE capabilities.

The UE capabilities define whether a UE requires compressed mode in order to monitor cells on other FDD frequencies and on other modes and radio access technologies. UE capabilities indicate the need for compressed mode separately for the uplink and downlink and for each mode, radio access technology and frequency band.

A UE shall support compressed mode for all cases for which the UE indicates that compressed mode is required. A UE does not need to support compressed mode for cases for which the UE indicates that compressed mode is not required. For these cases, the UE shall support an alternative means of making the measurements.

The UE shall support one single measurement purpose for one transmission gap pattern sequence. The measurement purpose of the transmission gap pattern sequence is signalled by higher layers.

The UE shall support simultaneous compressed mode pattern sequences which can be used for different measurements. The following measurement purposes can be signalled from higher layers:
  FDD;
  Time division duplex (TDD);
  Global system for mobile communications (GSM) carrier received signal strength indicator (RSSI) measurement;
  Initial BSIC identification;
  Base station identification code (BSIC) re-confirmation; and
  Evolved UTRA (E-UTRA).

The UE shall support one compressed mode pattern sequence for each measurement purpose while operating in FDD mode, assuming the UE needs compressed mode to perform the respective measurement. In case the UE supports several of the measurement purposes, it shall support in parallel one compressed mode pattern sequence for each supported measurement purpose where the UE needs compressed mode to perform the measurement. The capability of the UE to operate in compressed mode in uplink and downlink is given from the UE capabilities.

3GPP TS 25.133 v8.6.0 (2009-03), Section 8.4.2.1 gives details on UE measurement capabilities when high-speed downlink shared channel (HS-DSCH) discontinuous reception is not ongoing. In CELL_FACH state, the UE shall be able to monitor up to
  32 intra frequency FDD cells and
  32 inter frequency cells, including
    FDD cells distributed on up to 2 additional FDD carriers and
    Depending on the UE capability, TDD mode cells, distributed on up to 3 TDD carriers, and
  Depending on the UE capability, 32 GSM cells distributed on up to 32 GSM carriers.
  Depending on the UE capability, the UE shall be able to monitor up to 16 intra frequency cells during idle period down link (IPDL) gaps.

The standard specification further specifies how the measurements on different systems and modes are performed given the time allocated to that system. The requirements are based on an assumption that the time during the measurement occasions that is allocated to each of the different modes and systems shall be equally shared by the modes which the UE has capability for and that are in the monitored set signalled by the network.

Section 8.4.2.5 gives details on GSM measurements when HS-DSCH discontinuous reception is not ongoing. To support cell reselection the UE shall always perform BSIC verification in Cell_FACH state.

In CELL_FACH state when measurement occasions are provided by the UTRAN, the UE shall continuously measure GSM cells and search for new GSM cells given in the monitored set.

In section 8.4.2.1 the split of measurements between different modes and systems is defined. Every second measurement occasion scheduled for GSM measurements, as given by 8.4.2.1 shall be allocated for GSM initial BSIC identification.

The remaining measurements occasions scheduled for GSM measurements shall be used as follows. 3 occasions out of 4 shall be allocated for GSM carrier RSSI measurements and 1 out of 4 shall be allocated for GSM BSIC reconfirmation. The scheduling of measurement occasions between GSM carrier RSSI measurements and GSM BSIC re-confirmation is up to the UE.

The 3GPP standard provides some minimum requirements that must be fulfilled by a UE. But some field test conditions can require going beyond the 3GPP nominal requirements.

For instance by taking a specific example of GSM carrier measurements and BSIC re-confirmation measurements, it can be realised that these second generation (2G) measurement purposes indicated in the 3GPP standard have different timing constraints: while a GSM carrier RSSI measurement can be performed at any time, the BSIC re-confirmation must be performed at a specific time instant (frame number+quarter bit position).

So as the network defines some generic gap purpose patterns, this means that a gap purpose with BSIC re-confirmation does not always match with the BSIC re-confirmation of one UE and so the BSIC re-confirmation is delayed and can lead to a loss of synchronisation with a 2G cell.

It is thus the object of the present invention to overcome the above-identified difficulties and disadvantages by proposing an improved solution for performing radio measurements.

SUMMARY OF THE INVENTION

According to a first aspect of the invention, there is provided a method of performing inter radio access technology (RAT) measurements for a communication device camped on a first radio communication network operating in accordance with a first radio access technology, the measurements being carried out, during given measurement gaps each of which being characterised by a specific gap purpose indicating a measurement type, with respect to a second communication network operating in accordance with a second radio access technology. The method comprises:

the communication device determining whether a given measurement gap coincides in time domain with a measurement position defined by the communication device for performing measurements with respect to the second communication network; and in case the measurement position coincides with the position of the measurement gap, then the communication device performing during the measurement gap a first type of measurement with respect to the first communication network and a second type of measurement with respect to the second communication network.

This invention allows improving inter system measurements, e.g. 2G measurements when 3G camped due to the fact that more measurements are performed. This means that the service continuity (inter RAT handover) is increased between different networks, e.g. 3G and 2G networks.

According to a second aspect of the invention, there is provided a computer program product comprising instructions for implementing the method according to the first aspect of the invention when loaded and run on computer means of a communication device.

According to a third aspect of the invention, there is provided a communication device, such as a mobile phone, for performing inter radio access technology radio measurements, the communication device being camped on a first radio communication network operating in accordance with a first radio access technology, the measurements being arranged to be carried out during given measurement gaps, each of which being characterised by a specific gap purpose indicating a measurement type, with respect to a second communication network operating in accordance with a second radio access technology. The communication device comprises:

a processor for determining whether a given measurement gap coincides in time domain with a measurement position defined by the communication device for performing measurements with respect to the second communication network; and a measurement unit for, in case the measurement position coincides with the position of the measurement gap, performing during the measurement gap a first type of measurement with respect to the first communication network and a second type of measurement with respect to the second communication network.

Other aspects of the invention are recited in the dependent claims attached hereto.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF AN EMBODIMENT OF THE INVENTION

Next one embodiment of the present invention is described in more detail with reference to the attached figures.

This invention allows the mobile to adapt its measurement based on the constraint of the different measurements and the measurement gap allocation.

The aim of this invention is to adapt the measurement purpose provided by the network in DCH mode or defined in the 3GPP standard for the FACH mode. For the case of the DCH mode, the purpose of each compressed mode gap is defined by the network and shall be used by the UE. But in accordance with the present invention a UE is able to adapt the purpose of each gap based on its internal measurement as explained later.

In one specific example the improvement is linked to the GSM carrier RSSI measurement and to the BSIC re-confirmation gap purposes. Both of these inter RAT activities are specified by a specific gap purpose. However, the measurement constraints of both activities are very different:

The GSM carrier RSSI measurement can be performed in all measurement gaps due to the constant power level of GSM beacons.

The BSIC re-confirmation can only be performed at a specific time instant defined by a GSM frame number and specific quarter bit.

In accordance with the teachings of the present invention the UE tries to mix both activities. When the UE receives a gap purpose allocated for a GSM carrier RSSI measurement or BSIC re-confirmation measurement, it performs the following activities:

Determines if the gap position matches with a position of a BSIC re-confirmation defined by itself. In the affirmative, the UE then schedules this gap position to a BSIC re-confirmation measurement;

Then fills the time remaining in the gap position with GSM carrier RSSI measurement.

Figure 1:
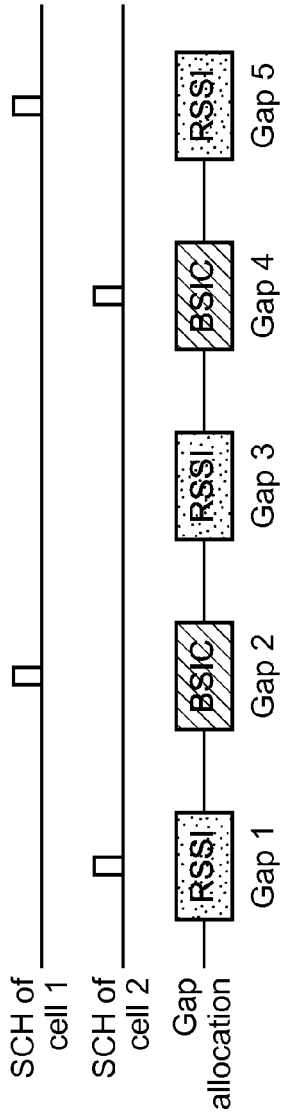
FIG. 1 shows the relationship between gap allocation and BSIC re-confirmation measurement positions when the UE is in DCH mode.

FIG. 1 gives an example of a synchronisation channel (SCH) position on network side (to perform BSIC re-confirmation) and of a gap allocation from the network. The UE operates in DCH mode in this example. From the figure it can be realised that during the shown time interval the UE has only two possibilities to perform BSIC measurements. These possibilities are shown in the figure as distinct step functions for each cell. The position of these steps is defined by the UE, whereas in the DCH mode the gap allocation is defined by the network.

Without the present invention, the UE is able to read once each BSIC due to the gap allocation from the network:
During gap 2 for cell 1; and
During gap 4 for cell 2.

By applying the teachings of the present invention, the UE is able to read twice each BSIC during the illustrated time period:
During gaps 2 and 5 for cell 1; and
During gaps 1 and 4 for cell 2.

Activities on the radio interface for each gap will be the following ones:
During gap 1, the UE schedules the BSIC re-confirmation of cell 2 and also some GSM carrier RSSI measurement.
During gap 2, the UE schedules the BSIC re-confirmation of cell 1 and adds also some GSM carrier RSSI measurement to compensate the measurement not performed during gap 1.
During gap 3, the UE schedules only some GSM carrier RSSI measurement.
During gap 4, the UE schedules the BSIC re-confirmation of cell 2 and also some GSM carrier RSSI measurement.
During gap 5, the UE schedules the BSIC re-confirmation of cell 1 and also some GSM carrier RSSI measurement.

The invention considers also the fact that several BSIC re-confirmations (of several cells) can be performed during the same gap if this gap is a GSM carrier RSSI measurement gap or BSIC reconfirmation gap.

For the case of the FACH mode, the same management than in DCH can be applied except that instead of having the gaps equally shared for different purposes, the UE can have equally shared management in terms of timing.

Figure 2:
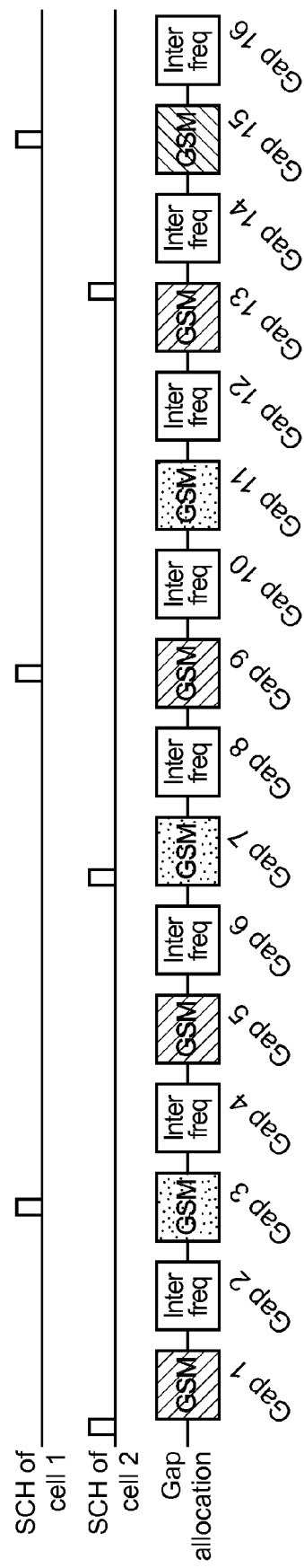
FIG. 2 shows the relationship between gap allocation and BSIC re-confirmation measurement positions when the UE is in FACH mode.

FIG. 2 gives an example of a gap allocation when the UE operates in FACH mode. As defined by the 3GPP standard, 1 measurement occasion (or gap) out of 2 is allocated to GSM and within GSM gaps 1 out of 2 is allocated to BSIC identification (gaps with backward hatching in the figure) and for the last gaps, 3 out of 4 are allocated to RSSI measurements (gaps with dots in the figure) and one gap is allocated to BSIC re-confirmation (gap with forward hatching in the figure). This means that:
Gaps 2, 4, 6, 8, 10, 12, 14 and 16 are allocated to inter frequency measurements;
Gaps 1, 5, 9 and 13 are allocated to BSIC identification;
Gaps 3, 7 and 11 are allocated to GSM RSSI measurements; and
Gap 15 is allocated to BSIC re-confirmation.

Concerning the BSIC re-confirmation and without this invention, the UE is able to perform only the BSIC re-confirmation of cell 1 (during gap 15). The BSIC re-confirmation of cell 2 requires longer time interval, i.e. more gaps.

By using the teachings of the present invention, the UE is able to do the following:
Perform the BSIC re-confirmation of cell 1 during gap 3;
Perform the BSIC re-confirmation of cell 2 during gap 7; and
Perform the BSIC re-confirmation of cell 1 during gap 15.

Activities on the radio interface for each gap linked to GSM RSSI measurement and BSIC re-confirmation are the following ones:
During gap 3, the UE schedules the BSIC re-confirmation of cell 1 and also some GSM carrier RSSI measurement.
During gap 7, the UE schedules the BSIC re-confirmation of cell 2 and add also some GSM carrier RSSI measurement.
During gap 11, the UE performs some GSM carrier RSSI measurement.
During gap 15, the UE schedules the BSIC re-confirmation of cell 2 and also some GSM carrier RSSI measurement to compensate the measurement not performed during gap 3 and gap 7.

Compensation from one gap to another one is performed to ensure that the 3GPP standard requirements regarding the gap allocation for GSM RSSI measurements are at least met. This means that for each gap allocated for RSSI measurements the UE should ensure that at least the equivalent of one complete gap is allocated for GSM RSSI measurement even if spread over several gaps. This invention also considers the case where more GSM RSSI measurements are performed.

Figure 3:
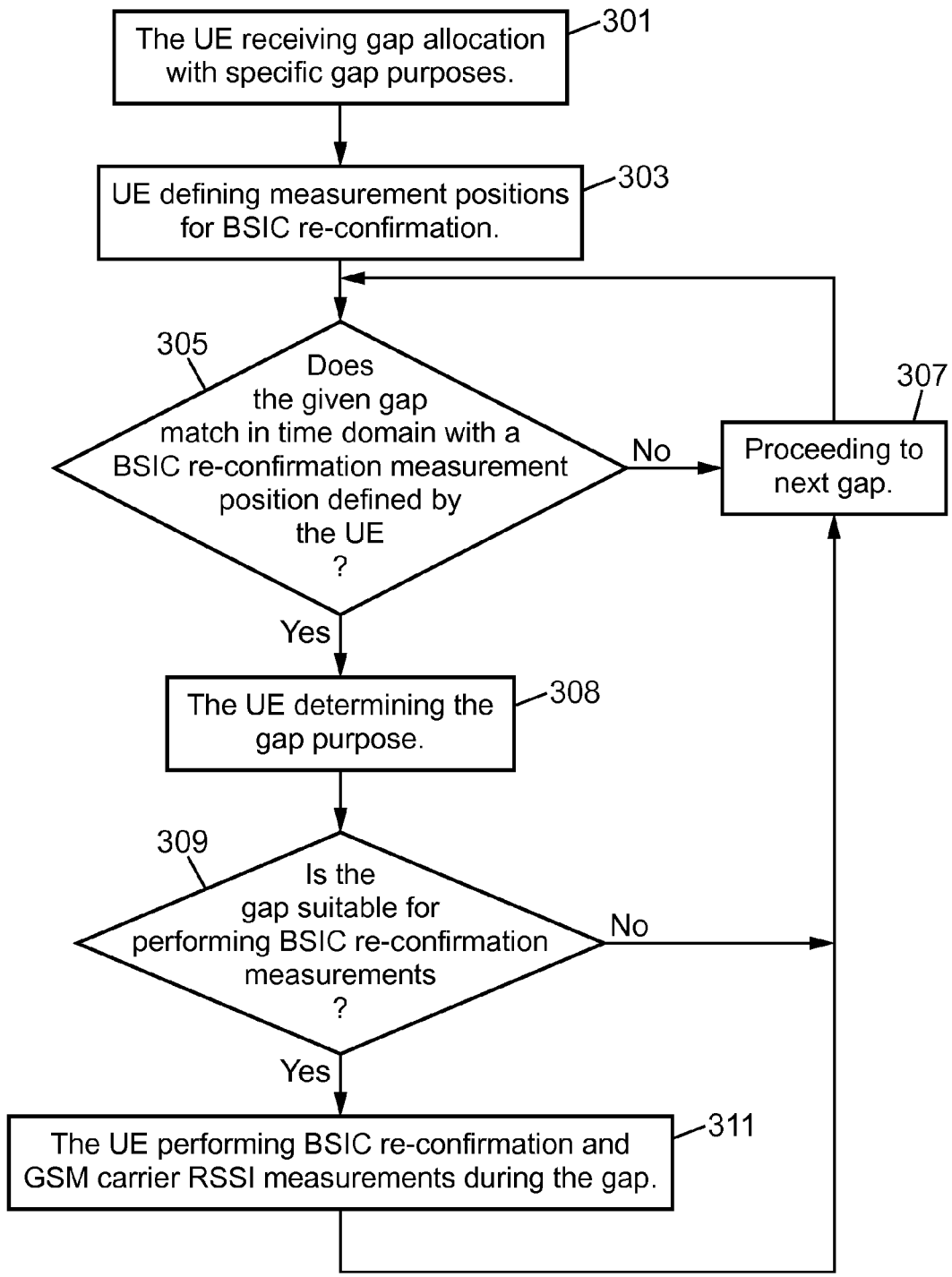
FIG. 3 is a flow chart illustrating an embodiment for performing inter RAT measurements in accordance with the present invention.

The flowchart of FIG. 3 illustrates the method steps that are performed according to one embodiment of the present invention. In step 301 the UE receives the gap allocation configuration with specific gap purposes. In step 303 the UE defines measurement positions for performing BSIC re-confirmation measurements. As explained above when operating in DCH mode the gap allocation is defined by the network and when operating in FACH mode the gap allocation is defined by the 3GPP standard specification (see for instance, 3GPP specification 25.133 chapter 8.4.2 and 8.4.2.5.2). Next in step 305 the UE determines whether the current gap matches in time domain with a BSIC re-confirmation measurement position, which was defined in step 301 by the UE. If the response is negative, then the process continues in step 307 by proceeding to next gap. Then the operation of step 305 is performed again.

On the other hand if the response to the question of step 305 is in the affirmative, then in step 308 the UE determines the gap purpose. Then in step 309 the UE determines whether the current gap is actually suitable for performing BSIC re-confirmation measurements. For instance with reference to FIG. 2, the gaps allocated to BSIC identification measurements cannot be used for BSIC re-confirmation measurements even if the measurement positions defined by the UE coincide with these gaps. If the gaps are not suitable for BSIC re-confirmation measurements, then the process continues in step 307. If on the other hand the gaps can be used for BSIC re-confirmation measurements then in step 311 the UE first performs BSIC re-confirmation measurements and then GSM carrier RSSI measurements during the same gap. In this example the two types of measurements are thus done consecutively. It is to be noted that it is also possible first to perform the GSM carrier RSSI measurements and then the BSIC re-confirmation measurements. From step 311 the process continues in step 307.

Figure 4:
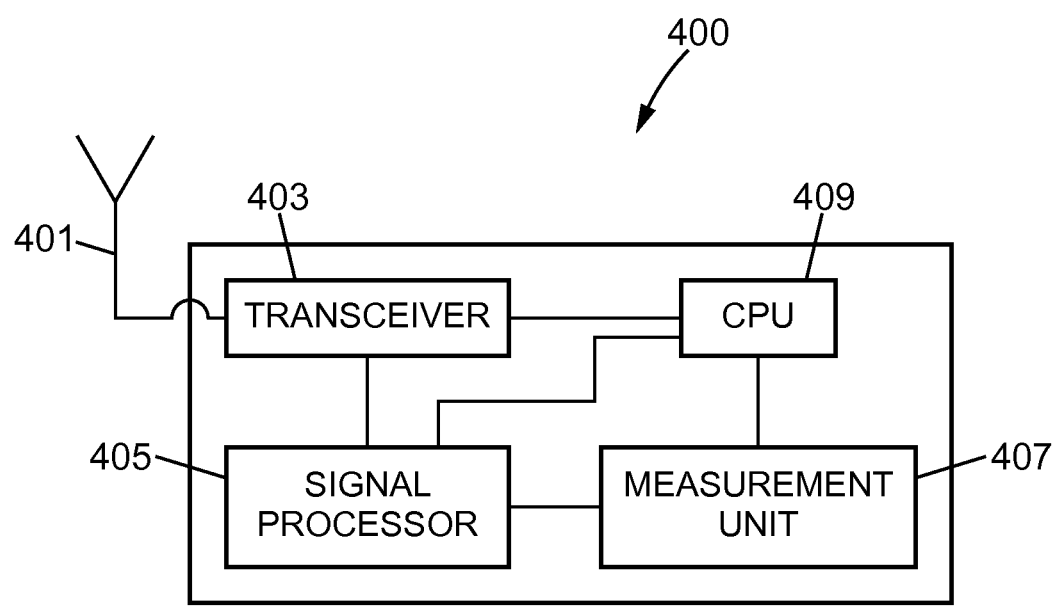
FIG. 4 shows a simplified block diagram of a communication device.

FIG. 4 shows a simplified block diagram of the communication device that is arranged to implement the method described above. An antenna 401 is arranged to receive radio signals including the gap allocation (step 303) and they are then fed to a transceiver unit 403. A signal processor 405 processes the received signal. Operations such as demodulation and decoding are well known to a skilled person in the art. The processed signal is then fed to a measurement unit 407 that is arranged to perform the actual measurements. A central processing unit (CPU) 409 controls the overall operation of the device and is also arranged to perform steps 301, 305, 307 and 309 as explained above. In one variation one signal processor is arranged to perform all signal processing, i.e. steps 301, 305, 307, 309 and 311.

Above one embodiment of the present invention was described. However, the invention is by no means restricted to the described embodiment. In broad terms the present invention provides a method for performing inter RAT measurements. The purpose of different measurement gaps is obtained either from the network or defined in a standard specification. To improve inter RAT measurements, the UE can adapt the purpose of each measurement gap to its needs. The present invention provides a way for the UE to perform a dynamic allocation of some measurement gaps in order to be able to increase certain measurement rate, such as the BSIC re-confirmation rate, and so to increase the tracking of the cells that belong to another RAT.

The invention also relates to a computer program product that is able to implement any of the method steps as described above when loaded and run on computer means of a communication device. The computer program may be stored/distributed on a suitable medium supplied together with or as a part of other hardware, but may also be distributed in other forms, such as via the Internet or other wired or wireless telecommunication systems.

The invention also relates to an integrated circuit that is arranged to perform any of the method steps in accordance with the embodiments of the invention.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method of performing inter radio access technology radio measurements for a communication device camped on a first radio communication network operating in accordance with a first radio access technology, the measurements being carried out, during given measurement gaps each comprising a specific gap purpose indicating a measurement type, with respect to a second communication network operating in accordance with a second radio access technology, the method comprising:
the communication device determining whether a given measurement gap coincides in time domain with a measurement position defined by the communication device for performing measurements with respect to the second communication network; and
in case the measurement position coincides with the position of the measurement gap, then the communication device performing during the measurement gap a first type of measurement with respect to the second communication network and a second type of measurement with respect to the second communication network,
wherein the first type of measurement is a base station identity code re-confirmation measurement and the second type of measurement is a GSM carrier received signal strength indicator measurement.

2. The method according to claim 1, further comprising the communication device determining whether it is allowed to perform certain type of measurements during the gap based on the specific gap purpose of the measurement gap.

3. The method according to claim 1, wherein the measurement gap is allocated for one of the following: GSM carrier received signal strength indicator measurement and base station identity code re-confirmation measurement.

4. The method according to claim 1, wherein the measurements are done in compressed mode.

5. The method according to claim 1, further comprising the communication device receiving a gap allocation with a specific gap purpose for each measurement gap.

6. The method according to claim 1, wherein the gap allocation is either provided by the first communication network or defined by a specification of the first radio communication network.

7. The method according to claim 1, wherein the first type of measurement and the second type of measurement are of different length in time domain.

8. The method according to claim 1, wherein the second type of measurement is continued during another measurement gap.

9. The method according to claim 1, wherein the first type of measurement and second type of measurement are performed consecutively.

10. A computer program product comprising instructions for implementing the steps of a method according to claim 1 when loaded and run on computer means of a communication device.

11. A radio communication device for performing inter radio access technology radio measurements, the communication device being camped on a first radio communication network operating in accordance with a first radio access technology, the measurements being arranged to be carried out during given measurement gaps, each comprising a specific gap purpose indicating a measurement type, with respect to a second communication network operating in accordance with a second radio access technology, the communication device comprising:
a processor for determining whether a given measurement gap coincides in time domain with a measurement position defined by the communication device for performing measurements with respect to the second communication network; and
a measurement unit for, in case the measurement position coincides with the position of the measurement gap, performing during the measurement gap a first type of measurement with respect to the second communication network and a second type of measurement with respect to the second communication network,
wherein the first type of measurement is a base station identity code re-confirmation measurement and the second type of measurement is a GSM carrier received signal strength indicator measurement.

12. The radio communication device according to claim 11, wherein the measurement unit is further arranged to determine whether the communication device is allowed to perform certain type of measurements during the gap based on the gap purpose of the measurement gap.

13. The radio communication device according to claim 11, further comprising a receiver for receiving a gap allocation with a specific gap purpose for each measurement gap.

14. The radio communication device according to claim 13, wherein the gap allocation is either provided by the first communication network or defined by a specification of the first radio communication network.

* * * * *